Dec. 9, 1952 J. GOEDECKER ET AL 2,620,592
VARIABLE PITCH HELICOPTER ROTOR
Filed Oct. 17, 1950 2 SHEETS—SHEET 1
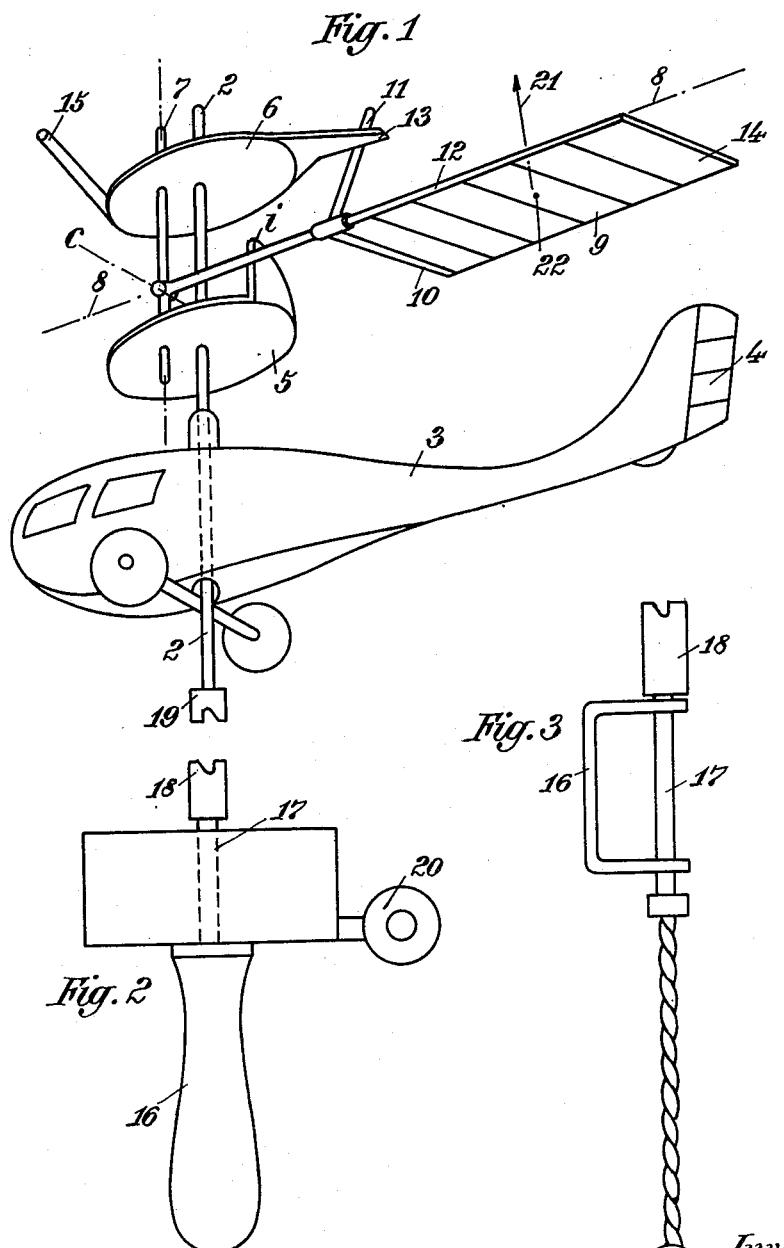
Inventors
JACOB GOEDECKER
WILHELM MESKE
by Rodgend
Agent Dec. 9, 1952 J. GOEDECKER ET AL 2,620,592
VARIABLE PITCH HELICOPTER ROTOR
Filed Oct. 17, 1950 2 SHEETS—SHEET 2
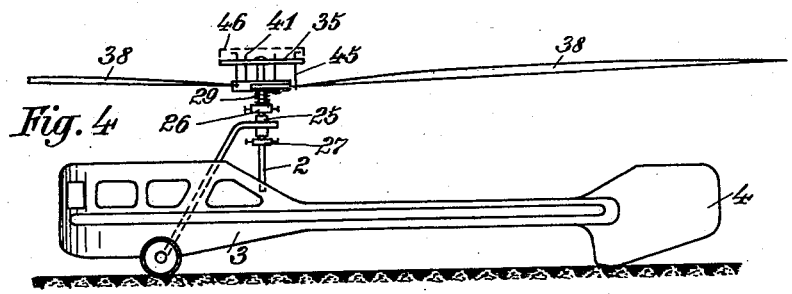
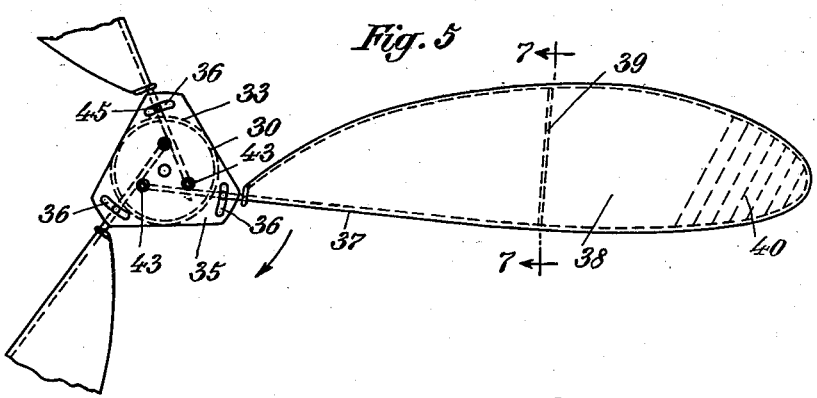
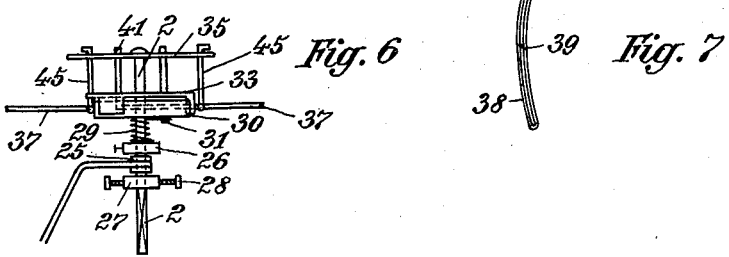
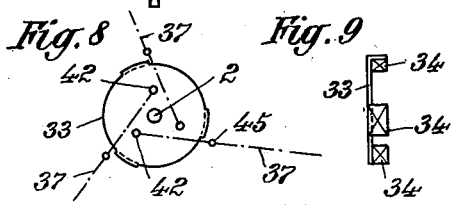
Inventors
JACOB GOEDECKER
WILHELM MESKE
by [signature]
Agent Patented Dec. 9, 1952

2,620,592

UNITED STATES PATENT OFFICE 2,620,592

VARIABLE PITCH HELICOPTER ROTOR

Jacob Goedecker, Mainz-Gonsenheim, and Wilhelm Meske, Mainz, Germany, assignors to Jacob Berg, Kommandit-Gesellschaft, Budenheim-on-the-Rhein, Germany, a company of Germany Application October 17, 1950, Serial No. 190,468
In Germany January 2, 1950

10 Claims. (Cl. 46—75)

The invention relates to an aircraft to be used as a toy or for educational purposes, and more particularly to an aircraft that can rise, glide and land by means of a propeller.

One of the principal objects of the invention is the provision of a toy aircraft having at least one propeller with blades of a variable pitch.

Another object of the invention is to provide a toy aircraft wherein the pitch of the propeller blades is automatically controlled so that the blades will have a zero pitch at the start and thereafter a pitch which enables ascent of the craft. Finally, when the rotary speed of the propeller is reduced below a predetermined value, the pitch of the blades will be reversed, whereby the craft will operate as an autogyro, making it possible that the rotary speed is increased under the impulse of the air current striking against the underside of the blades during descent of the craft, thereby enabling gliding and landing merely with the aid of the propeller.

The toy aircraft according to my invention is a helicopter-like aircraft. It takes off substantially vertically and is enabled to glide freely and to land smoothly, whereas prior toy aircrafts with rotary wings rose and upon a gradual loss of the rotary wing speed fell to the ground. The old constructions rose due to a screw propeller the position of the blades of which was permanently set. As soon as the spinning speed of those old constructions reached a certain minimum value, the aircraft lost its balance and was unable to continue its flight to land.

A further object of the present invention is the provision of a mechanism whereby the blade pitch control is effected by the interplay of opposed momenta of centrifugal force and of power force applied to the propeller blades.

The foregoing and other objects of the invention will be best understood from the following description of exemplifications thereof, reference being had to the accompanying drawings, wherein:

Fig. 1 is a perspective view illustrating the principles of a toy aircraft in accordance with my invention;

Fig. 2 is an elevational view of an auxiliary apparatus to start the operation of the toy aircraft;

Fig. 3 is an elevational view of a modified auxiliary apparatus serving the same purpose as that shown in Fig. 2;

Fig. 4 is a side elevational view of another embodiment of a toy aircraft embodying features of my invention;

Fig. 5 is a fragmentary plan view of the aircraft of Fig. 4, drawn to enlarged scale, the fuselage being omitted;

Fig. 6 is a fragmentary side elevational view illustrating a detail of the aircraft of Fig. 4, likewise drawn to enlarged scale;

Fig. 7 is a section taken in the plane of the line 7—7 of Fig. 5;

Fig. 8 is a schematic plan view of the control mechanism of the craft shown in Figs. 4-6;

Fig. 9 is a side elevational view of one of the control elements;

Fig. 10 is a plan view similar to that of Fig. 8, but showing a different part of the mechanism; and Fig. 11 is a side elevational view similar to Fig. 9, but showing a different control element of the mechanism.

In carrying the invention into effect, in the embodiments selected for illustration in the accompanying drawings and for description in this specification, and referring now particularly to Fig. 1, there is a shaft 2 that is journalled for rotation in the fuselage 3 of the aircraft, the fuselage 3 being provided at its tail end with a rudder 4. The rudder makes it possible to vary the position of the center of gravity and to steer the aircraft to some extent.

The shaft 2 carries a driver or hub that includes a lower disk 5 and an upper disk 6, these disks being spaced from each other and being rigidly secured to the shaft 2 for rotation therewith. A freely turnable auxiliary shaft 7 is journalled between the disks 5 and 6 parallel to the shaft 2, but spaced therefrom so that the axis of rotation of the auxiliary shaft 7 is offset against the axis of rotation of the hub referred to that coincides with that of the shaft 2. The rotary mechanism of the craft comprises, in addition to the shafts 2 and 7 and the hub disks 5 and 6, propeller blades, one of these blades being shown in the illustration of Fig. 1 and being designated 9.

The blade 9 with its radial bar 12 is pivoted about an axis c to the auxiliary shaft 7, the axis of the blade 9 being designated 8. The blade 9 is tiltable about the bar 12 and thus about the axis 8 and is provided with an interior spar 10 that is rigidly connected to a projecting arm 11 and is rotatable therewith about the bar 12. Angular movement of the arm 11 will cause tilting or rotation of the blade 9 about the bar 12, whereby the pitch of the wing blade is set.

An extension $i$ on the lower disk 5 normally abuts against the bar 12, and a projection 13 of the upper disk 6 is disposed adjacent the arm 11. The blade is enabled to rotate with the hub about the shaft 2 and, owing to the offsetting of the shafts 2 and 7, also about the auxiliary shaft 7 against the hub, and furthermore it can move upwardly and downwardly about the axis c. Finally, the blade 9 can also tilt about the bar 12. Normally, the blade will be in a position wherein the bar 12 is in abutment with the extension i, and a power formed by an opposing momentum as explained below and/or a mechanism, such as a spring (not shown in Fig. 1), is provided to return the bar 12 and thereby the blade to that normal position. The arm 11, during the movement of the blade away from that normal position, describes a certain path, and the projection 13 which protrudes into said path engages the arm 11 during said movement of the blade from the normal position. The engagement between the projection 13 and the arm 11 will cause an angular movement of the latter resulting in a change of the pitch of the blade, and it will be understood that the extent of the displacement of the arm 11 and, therefore, of the change in pitch will substantially be proportional to the distance of the blade from its normal position or, in other words, to the angular distance that the bar 12 is spaced from the extension i.

The drag point 22 and the resultant force 21 of the lift are spaced from the bar 12 and, thus, provide a momentum that is opposed to the momentum exercised by the engagement of the arm 11 with the projection 13. The first named momentum may be augmented by the provision of a spring (not shown), as mentioned before, or may be relied upon alone, without using a spring, to provide for the pitch control of the blade 9. The blade 9 is designed, for instance, by provision of extra weight so that the center of gravity will be located near the tip of the wing as shown at 14. This has the advantage of eliminating disturbing gyroscopic forces from upsetting the desired interplay of forces.

My toy helicopter may be provided with one or several propellers and each propeller may comprise one or several blades.

In order to start the operation of the craft, the shaft 2 may be energized by a motor which either forms part of the craft or is temporarily connected thereto or both. As an example of the first named kind, there may be provided on the upper disk 6 a jet 15 that may operate on compressed elastic fluids in a manner well known to those familiar with this and related arts. As an example of the second kind, there may be used a mechanical starting apparatus of the types illustrated in Figs. 2 and 3.

In the apparatus of Fig. 2, a handle 16 carries a revolvable shaft 17 that is provided with a clutch part 18 designed for temporary engagement with a corresponding clutch part 19 mounted on the lower end of the shaft 2. The shaft 17 of the apparatus may be energized by a spring mechanism 20 in any well known suitable manner.

In the modification shown in Fig. 3, the shaft 17 is energized by means of a twisted rod and a mating nut cooperating therewith in a conventional manner.

Further, in the apparatus of Figs. 2 and 3, there is preferably provided known means for terminating the energization of the revolvable shaft 17 and thereby of the clutch member 18 when a desired quantum of rotary energy has been imparted to the shaft 2 of the craft. As the speed of the shaft 2 is increased, the centrifugal force will act on the blade, and arm 11 will engage 13 to increase the incidence of the blade, all this occurring while the clutch members 18, 19 are engaged. The result will be that the increased pitch of the blade will result in a lifting force which will automatically disengage the clutch members.

The operation of an aircraft according to the above described principle is as follows: At rest, the bar 12 of the wing abuts against the extension i and the blade 9 is substantially at zero pitch. At this position, the shaft 2 is rotated either by the jet 15 or any of the apparatus of Fig. 2 or 3 or both or by any other suitable internal or external energizing means. The extension i will drive the rotary wing, and since the blade is at zero pitch, the craft at this time will not rise. As soon as the energization ceases and the hub will, therefore, no longer exercise a drive momentum onto the propeller blade, the latter owing to centrifugal force will move about its pivot point of the auxiliary shaft 7 and, thus, move away from its normal position, whereby the bar 12 will move away from its engagement with the extension i. The ensuing engagement between the arm 11 and the projection 13 will cause a tilting of the blade and of the pitch thereof. The craft will now start its ascent. During the ascent, the craft will reach a certain height commensurate with the energy it is spending during the rise. Gradually, the rotary speed of the blades will decrease and, hence, the centrifugal force will decrease accordingly. Due to the power means of either a spring (not shown) or the momentum of the drag point center 22 exercised on the blade 9 or both, the blade will return to its normal position after centrifugal force has dropped below a predetermined value. This return movement results in a change of the blade pitch in an opposite direction, as compared with the previous change, until the blade reaches zero pitch and, beyond that, a negative pitch. During the ensuing descent, the air lift acting against the underside of the blade 9, the latter having now a negative pitch, will increase the rotary speed thereof. Therefore, there results gliding and a subsequent landing with the propeller active in supporting the craft.

In the embodiment shown in Figs. 4-11, a fuselage 3 has traction wheels for ground movement and a steering surface 4. A bracket is secured to the fuselage and holds a bearing sleeve 25 which receives the shaft 2. The latter rotates freely in the sleeve 25. A lower spacing ring 27 and an upper spacing ring 26 are secured to the shaft 2 to adjustably limit the vertical movement of the shaft relative to the bearing sleeve 25. The lower spacing ring 27 is preferably designed so as to constitute a clutch member for use in connection with a starting apparatus of the type shown in Figs. 2 and 3.

A dished member 30 which is open on top is journalled on the shaft 2 to be freely rotatable. A spring 29 is provided between the upper spacing ring 26 and a boss 31 on the underside of the member 30 in order to urge the dished member 30 to return to its normal position. The vertical flange of the member 30 is provided with oblique kerfs 32 as is best shown in Fig. 11.

A hub which is secured to said shaft 2 and is rotatable therewith includes a cover 33 near the top of the member 30 and a disk 35 that is spaced above said cover 33, both the cover 33 and the disk 35 being rotatable with the hub and the shaft 2. The cover 33 forms together with the member 30 an enclosure and is provided with spaced downwardly extending projections 34 that reach over the sides of the member 30 and operate, as will be explained presently, to limit the pitch control movement of the blades.

There are three blades 38 in this craft. A single piece of resilient wire 37 is bent back upon itself to form a loop for the blade material, and the free end of the wire is bent upwardly to form an arm 41 that is journalled in openings 42 and 43 of the hub parts 33 and 35, respectively, for pivot connection of the blade to the hub. The pivot points of the three blades are, in accordance with the foregoing description of the system of my aircraft construction, disposed excentrically of the shaft 2 and, thus, of the axis of the entire aircraft, as can clearly be seen in Figs. 5, 8 and 10.

The wire of each blade, furthermore, is disposed in a kerf 32 of the member 30 and, owing to the action of the spring 29 exerted against the member 30, is in abutment with an edge of one of the projections 34 of the cover 33.

The disk 35 of the hub is provided with arcuate slots 36, and each wing wire has an extension 45 spaced from the arm 41 and projecting upwardly through a slot 36 for cooperation therewith.

The blades may be formed by thin material, such as thin paper, whereby the material extends over both sides of the area within each loop, as best shown in Fig. 7. A curved spar 39 may be inserted between the loop sides to provide the blade 38 with the desired curvature for best aerodynamical performance of the craft. The tip 40 of the blades is reinforced by an intermediate layer.

Thus, it is provided that one end of each blade is disposed in the enclosure above referred to. The end of each blade wire extends therefrom between two adjacent projections 34 of the cover 33 and is placed in the oblique kerf 32 of the member 30, while the bent wire arms 41 are pivoted in the hub parts to provide a pivoting axis for the blade which is parallel to and spaced radially from the axis of rotation of shaft 2. The spring 29 and the kerfs 32 are arranged so that the blades will be urged to pivot around the axes provided by arms 41 for return to their normal position. The projections 34 that in the normal position of the blades are spaced therefrom act to limit the movement of the blades away from their normal position.

The operation of the embodiment of Figs. 4–11 is as follows:

During energization of the shaft 2, for instance, by an outside source apparatus of the type of Figs. 2 and 3, the blades 38 are substantially at zero pitch, and certain of the projections 34 abut against the end portions of the wing wires 37. Upon cessation of the energy supply to the shaft 2, the blades, due to their excentrical pivoting relative to the shaft axis, move under the influence of centrifugal force away from their normal position, and the wires 37 move away from the said certain projections 34. This movement takes place against the force exerted by the spring 29 and transmitted to the member 30, the kerfs 32, and thence to the blade wires 37.

The extent of this movement is positively limited to the distance between adjacent projections 34, and the wires 37 will strike such projections 34 if the entire distance is covered by such movement.

Before such movement is completed, the arm 45 of each blade will engage against the end of the related arcuate slot 36 of the disk 35 in which the arm 45 moves, and this engagement will cause the wire 37 to twist in the portion between arms 41 and 45 thereby tilting the blade 38 and causing a pitch variation thereof for increasing the angle of attack so that the craft will jump-start. After the rotary energy of the blades has been substantially spent during the ascent of the craft, the reduced rotary speed will cause the centrifugal force to decrease, resulting in a return of the blades to their normal positions, whereby the pitch will be turned to zero and beyond that to become negative. This return movement, in the main, will be brought about by tension of the spring 29, and it may in part be aided by the force of the momentum of the drag center exercised on each blade of the propeller.

As mentioned above, the starting energy may be derived from an outside source or a source on the craft or both.

The source on the craft may again be a motor, for instance, one of the jet type shown in Fig. 1, or it may be any other suitable known or conventional driving mechanism.

It is believed that my invention, as well as the construction and operation of the forms shown for practicing the invention, and the many advantages thereof, will be understood from the foregoing detailed description thereof. The wings of the propeller of my toy aircraft adjust themselves automatically. During the period of high rotary speed, they assume an ascending pitch. When the rotary speed decreases, the pitch of the propeller becomes smaller and automatically and gradually changes to a descending pitch. The stream of air striking against the underside of the propeller wings acts now to drive the propeller in the same direction, thus again increasing the rotary speed and making possible a continued flight to make the aircraft glide and land. Thus, an aircraft rising by means of a screw propeller automatically changes to a glider type craft.

It will be apparent to those skilled in the art that the novel principles of my invention disclosed herein in connection with the specific exemplifications thereof will suggest various other modifications and applications of the same. It is, accordingly, desired that in construing the breadth of the appended claims they shall not be limited to the specific exemplifications of the invention described herein.

Having thus described my invention, what I claim as new and desire to protect by Letters Patent is as follows:

1. In a toy aircraft; the combination of a rotated shaft, at least one rotor blade assembly, means supporting said blade assembly on said shaft for swinging relative to the latter about an axis parallel to the axis of said shaft and spaced radially from the latter, stop means for limiting the swinging movement of said blade assembly relative to said shaft at least in the direction counter to the direction of rotation of said shaft, said blade assembly including a blade and an arm extending from said blade and fixed relative to the latter, said blade and arm being tiltable about an axis disposed ahead of the center of pressure of said blade to vary the angle of attack of the blade, and means fixed relative to said shaft and engageable with said arm to tilt said arm and blade in the direction increasing the angle of attack of the latter when said blade assembly swings relative to said shaft in the direction of the rotation of the latter away from said stop means.

2. In a toy aircraft; the combination according to claim 1, wherein said means supporting said blade assembly on the rotated shaft includes radially extending members fixed on said rotated shaft, and an auxiliary shaft journalled in said radially extending members for swinging movement about an axis parallel to and spaced radially from said rotated shaft, said blade assembly including a spar pivoted at its inner end to said auxiliary shaft for swinging relative to the latter about an axis normal to the axis of swinging movement of said auxiliary shaft, said blade being mounted at its leading edge on said spar for tilting movement about an axis extending longitudinally of said spar.

3. In a toy aircraft; the combination according to claim 2, wherein said stop means consists of a projection on one of said radially extending members extending into the path of swinging movement of said spar about the axis of said auxiliary shaft.

4. In a toy aircraft; the combination according to claim 3, wherein said arm extends from said blade in a direction radially with respect to the longitudinal axis of said spar, and wherein said means for tilting the arm and blade includes an abutment member projecting from the other of said radially extending members on the rotated shaft for engagement against the side of said arm facing in the direction of rotation of said rotated shaft, said arm and abutment member being disposed so that said blade is positioned for low angle of attack when said spar engages said stop projection and said arm engages said abutment member.

5. In a toy aircraft; the combination according to claim 1, including means for initially driving said rotated shaft so that said blade assembly swings relative to said rotated shaft in the direction counter to the rotation of the latter and against said stop means to permit said blade to assume a low angle of attack position, whereby, when said driving means is rendered inoperative, said blade assembly centrifugally swings relative to said rotated shaft in the direction of rotation of the latter so that the angle of attack of said blade is thereby increased.

6. In a toy aircraft; the combination according to claim 1, wherein said blade assembly includes a blade and a resilient wire spar having a portion extending along the leading edge of said blade and inwardly beyond the root end of the latter, the inner end of said spar portion being bent at right angles to the chordal plane of said blade, and wherein said blade supporting means includes upper and lower support members fixed on said rotated shaft in axially spaced relationship and formed with axially aligned openings spaced radially from the axis of rotation of said rotated shaft to swingably receive said bent end of the inwardly extending spar portion.

7. In a toy aircraft; the combination according to claim 6, wherein said arm is integral with said spar portion and spaced outwardly from said bent inner end of the latter, said upper support member having an opening to receive the end of said arm of a rotor blade assembly so that said spar portion is torsionally twisted when said spar swings relative to said rotated shaft with said opening receiving said arm and restraining movement of the latter and constituting said blade tilting means.

8. In a toy aircraft; the combination according to claim 7, wherein said stop means includes circumferentially spaced lugs on the periphery of said lower support member for loosely accommodating said spar portion therebetween and limiting the swinging motion of said spar portion relative to the axis of said rotated shaft.

9. In a toy aircraft; the combination according to claim 8, including yieldable means continuously urging said spar portion to swing relative to said rotated shaft in the direction counter to the rotation of the latter.

10. In a toy aircraft; the combination according to claim 9, wherein said yieldable means includes a disc movable axially on said rotated shaft and having a peripheral wall formed with an inclined slot adapted to receive said spar portion of the blade assembly, a spring member acting on said disc to displace the latter axially in the direction for swinging said spar portion relative to said rotated shaft on the direction counter to the rotation of said rotated shaft.

JACOB GOEDECKER.
WILHELM MESKE.

REFERENCES CITED

The following references are of record in the file of this patent:

UNITED STATES PATENTS

| Number | Name | Date |
|---|---|---|
| 1,829,443 | Gobereau et al. | Oct. 27, 1931 |
| 2,035,531 | Butcher | Mar. 31, 1936 |
| 2,178,014 | Brown | Oct. 31, 1939 |
| 2,308,916 | Halligan et al. | Jan. 19, 1943 |
| 2,443,144 | McCoy | June 8, 1948 |
| 2,524,059 | Kennedy | Oct. 3, 1950 |
| 2,537,393 | Bisch et al. | Jan. 9, 1951 |

FOREIGN PATENTS

| Number | Country | Date |
|---|---|---|
| 616,997 | Great Britain | Jan. 31, 1949 |